United States Patent [19]

Smartt et al.

[11] Patent Number: 4,825,038

[45] Date of Patent: Apr. 25, 1989

[54] METHOD FOR CONTROLLING GAS METAL ARC WELDING

[75] Inventors: Herschel B. Smartt; Carolyn J. Einerson; Arthur D. Watkins, all of Idaho Falls, Id.

[73] Assignee: The United States of America as represented by the United States Department of Energy, Washington, D.C.

[21] Appl. No.: 83,381

[22] Filed: Aug. 10, 1987

[51] Int. Cl.$^4$ .............................................. B23K 9/12
[52] U.S. Cl. ......................... 219/137 PS; 219/130.21; 219/137.71
[58] Field of Search ........... 219/130.21, 130.5, 137.71, 219/137 PS, 136, 130.33

[56] References Cited

U.S. PATENT DOCUMENTS

| | | | |
|---|---|---|---|
| 4,375,026 | 2/1983 | Kearney | 219/130.21 |
| 4,482,798 | 11/1984 | Hurlebaus et al. | 219/137.71 |
| 4,594,497 | 6/1986 | Takahashi et al. | 219/130.21 |
| 4,724,302 | 2/1988 | Penney et al. | 219/137.71 |

OTHER PUBLICATIONS

Smartt et al., "Gas Metal Arc Process Sensing and Control", *Advances in Welding Science and Technology*, ASM International, 1986.

*Primary Examiner*—Clifford C. Shaw
*Attorney, Agent, or Firm*—Hugh W. Glenn; Robert J. Fisher; Judson R. Hightower

[57] ABSTRACT

The heat input and mass input in a Gas Metal Arc welding process are controlled by a method that comprises calculating appropriate values for weld speed, filler wire feed rate and an expected value for the welding current by algorithmic function means, applying such values for weld speed and filler wire feed rate to the welding process, measuring the welding current, comparing the measured current to the calculated current, using said comparison to calculate corrections for the weld speed and filler wire feed rate, and applying corrections.

10 Claims, 3 Drawing Sheets 4,825,038

METHOD FOR CONTROLLING GAS METAL ARC WELDING

CONTRACTUAL ORIGIN OF THE INVENTION

The United States has rights in this invention pursuant to Contract No. DE-AC07-76ID01570 between the U.S. Department of Energy and EG&G Idaho, Inc.

BACKGROUND OF THE INVENTION

This invention pertains to a method of controlling an automated welding process, and more particularly, to a method for simultaneously controlling the transverse cross sectional area of the material added during welding, hereinafter the weld bead reinforcement area, and the heat input to the work piece in a gas metal arc (GMA) welding process.

In GMA welding, a consumable wire electrode passes through a copper alloy contact tip. Electric potential applied between the contact tip and the metal to be welded (base metal) results in a current in the wire which supports an arc between the wire end and the base metal. The wire electrode is melted by internal resistive power and heat transferred from the arc. Droplets of molten metal are transferred from the wire to the weld pool of the base metal by a combination of gravitational, Lorentz, surface tension and plasma forces. Heat is transferred to the base metal directly from the arc and also by the molten droplets. Electrode wire, molten droplets, weld pool and solidified well bead behind the weld pool are protected from oxidation by a shielding gas, such as argon or $CO_2$. GMA welding has been automated by providing means for controlling the rate of filler wire feed and means for controlling the weld speed (the relative motion between the contact tip and the work piece). Generally, control of the process has been limited to certain factors which machine builders have been accustomed to such as the filler wire feed rate, welding speed, current and voltage. These are parameters related to the process. To improve the mechanical and metallurgical properties of the finished weld, it would be advantageous to independently control the parameters related directly to the finished weld, such as, the weld reinforcement area and the heat input to the weld.

The weld reinforcement area is a function of the wire size, the wire feed rate and the welding speed, so the weld reinforcement area may be controlled by controlling these parameters. The desired weld reinforcement area will be dictated, in part, by the geometry of the work piece and may require adjustment during a welding run. Such adjustment may be accomplished by means of direct control of the welding speed and/or the filler wire feed rate. However, changing these parameters results not only in a change in the amount of metal deposited in the weld but also in the amount of heat transferred to the base metal. The heat input to the weld is important since it affects the cooling rate which in turn affects the metallurgical properties of the finished weld.

The heat input to the weld may be controlled by controlling the voltage and current. Again, the geometry of the work piece may dictate desired changes in the heat input during the welding run in order to maintain a uniform cooling rate and thus maintain predicably uniform metallurigcal quality in the weld. Heat input may be adjusted by controlling the welding current but this control is normally achieved by altering the wire feed rate thus the control of heat input is at the expense of adversely affecting the weld reinforcement area.

SUMMARY OF THE INVENTION

It is thus an object of the present invention to provide a method for controlling certain weld parameters in an automated GMA welding process. It is a further object to provide a method for achieving independent control of weld reinforcement area and heat input in an automated GMA welding process. It is a further object to provide a method for achieving independent control of weld reinforcement area and the cooling rate of the weldment in an automated GMA welding process.

The present invention provides a method for independently controlling both heat input and weld reinforcement area in an automated GMA welding process. A model has been devised that provides algorithmic function means for relating the weld parameters to be controlled to the mechanically controllable process parameters. The method of the invention comprises selecting desired values for heat input and weld reinforcement area; calculating the filler wire feed rate, weld speed and expected current by means of algorithmic function means; establishing the calculated filler wire feed rate and weld speed; measuring the actual current in the welding process; comparing the actual and expected current using the difference therein to calculate corrections to the wire feed rate and weld speed; and making such corrections. The method is applied in a continuous closed loop feedback process.

DETAILED DESCRIPTION OF THE INVENTION

Figure 3:
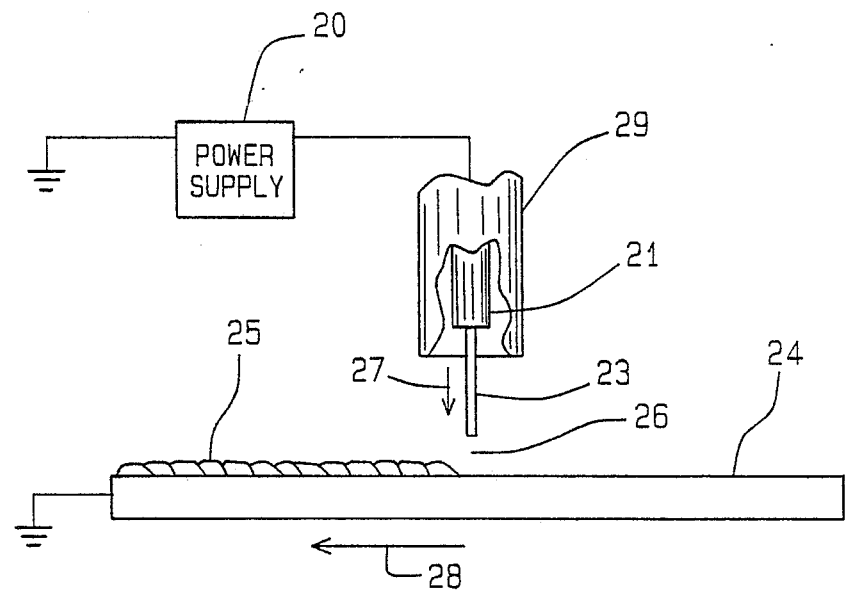
FIG. 3 is a schematic diagram of the conventional gas metal arc welding process.

In order to fully describe the method and apparatus of the present invention, it will be useful to first describe and derive the model developed for relating the final weld parameters to the process parameters. Reference is made to FIG. 3, which shows a schematic diagram of the conventional GMA welding process in order to define the parameters used in the derivation of model.

In FIG. 3, power supply 20 provides a potential difference E between contact tip 21 and work piece 24 resulting in a current I in a consumable wire electrode 23, which current supports an arc across the gap 26 between the work piece 24 and the wire electrode 23. The electrode wire 23 is melted by heat produced by its internal resistance and some heat tranferred from the arc. Molten droplets from the wire are transferred to the work piece 24 where the weld bead 25 is formed as the metal solidifies. Wire 23 is fed through the contact tip 21 by means of a feed mechanism (not shown) as the work piece is moved relative to the contact tip. Arrow 27 in FIG. 3 represents the direction of movement of the filler wire which is fed at a rate S and arrow 28 represents the direction of motion of the work piece 24 relative to the contact tip 21. A shielding gas, such as argon, is supplied to the arc area through the gas cup 29.

The GMA process may be operated with the electrode wire 23 at a positive or negative potential with respect to the base metal, using either a constant current or a constant voltage, with either pulsed or constant electrode wire speed and/or welding current. The most common operating conditions and those employed for the development of this model, are for an electrode wire to be at a positive potential using a constant voltage power supply, with constant wire speed and current.

Relevant process parameters include the open circuit potential of the power supply; the actual voltage between the contact tip and the work piece during operation; the current; the weld arc resistance; the welding speed, that is, the relative rate of motion between the work piece 24 and the contact tip 21; the wire feed rate; the character of the wire (size, density, specific heat, etc.); the distance between the contact tip and the work piece; and the distance between the contact tip and the end of the solid wire (wire stick-out).

Parameters relevant to the finished weld include the heat input to the work piece, the cooling rate, and the amount of metal deposited in the weld bead which may be expressed in appropriate terms such as mass per unit length of transverse cross-sectional area. Table 1 defines various symbols that are used herein for many of these parameters.

The model employed in the present invention is based on six equations.

The first relates the heat input to the base metal, per unit length, H, to the electrical power consumed and the weld rate, R.

$$H = \frac{n^*EI}{R} \quad (1)$$

The second equation gives the weld reinforcement area.

$$G = A_w \frac{S}{R} \quad (2)$$

The third equation is a characterization of the power supply relating the open circuit potential $E_0$ to the actual voltage drop from the contact tip to the work piece.

$$E = E_0 + nI \quad (3)$$

The fourth equation expresses the power balance between the arc and the wire.

$$IE = IV_w + IV_a \quad (4)$$

The fifth equation gives the power required to melt the wire.

$$IV_w + n'IV_a + A_w \delta SH_m \quad (5)$$

Finally, the sixth equation is merely a statement of Ohm's law.

$$IV_a = I^2 R_a \quad (6)$$

Equations 1, 2, and 3 may be solved to obtain expressions for the wire feed rate and weld speed.

$$S = \frac{GI}{A_w H} n^* (E_o + nI) \quad (7)$$

$$R = \frac{SA_w}{G} \quad (8)$$

Equations 3, 4, 5 and 6 may be solved to yield an expression for the current I.

$$I = \frac{E_o + \sqrt{E_o^2 + 4[n - (1 - n')R_a]SA_w\delta H_m}}{2[(1 - n')R_a - n]} \quad (9)$$

Together, equations 7, 8 and 9 provide a steadystate model of wire melting and base metal heat and mass inputs. Two terms in these equations, however require further evaluation. The efficiency of the heat transfer from the arc to the electrode wire, n', is defined as:

$$n' = \frac{1}{EI} \frac{dQ}{dt} \quad (10)$$

An emperical relationship for dQ/dt has been given by Waszink and VanDenHeuvel, Welding Journal, Vol. 61, No. 8, August 1982, page 269.

$$\frac{dQ}{dt} = 6I - 0.7 \times 10^6 \frac{dm}{dt} - 125 \quad (11)$$

Where $dQ/dt = SA_w\delta$, this was found to be the best available approximation for n'.

The other term that requires evaluation is the value of the arc resistance, $R_a$. Applicants have used a statistical analysis program, SAS Institute, Inc. 1982, Cary, NC, to relate arc resistance to the process parameters and found good fit between the data and an equation of the form.

$$R_a = C_o + C_1 Ct + C_2 E_o + C_3 \cdot I + C_4 Ct E_o \quad (12)$$

where $C_0$, $C_1$, $C_2$, $C_3$ and $C_4$ are empirically determined constants.

All the other terms and equations 7, 8 and 9 may be directly measured or are specified in the welding process. Together, equations 7, 8 and 9 provide a steady-state model of gas metal arc wire melting and base metal heat and mass inputs. The model, however, is not adequate for open loop control of the gas metal arc welding process. The present invention comprises a closed loop feedback control method in which the actual welding current is measured and compared to values predicted by equation 9 to obtain corrections which are applied to the wire feed rate.

Since the evaluation of equation 9 depends on the empirical evaluation of $R_a$ (equation 12) another approach was employed by applicants whereby the current I itself was evaluated empirically by means of the SAS program. The result, $$= C_o + C_1 Ct + C_2 E_o + C_3 S \quad (13)$$

where $C_0$, $C_1$, $C_2$, $C_3$, are again constants, has the advantage of being a simpler equation than equation 9 and when used in conjunction with equations 7 and 8 provided a control model that described the relationship between S, R and I at least as well as using equation 9 directly.

Figure 1:
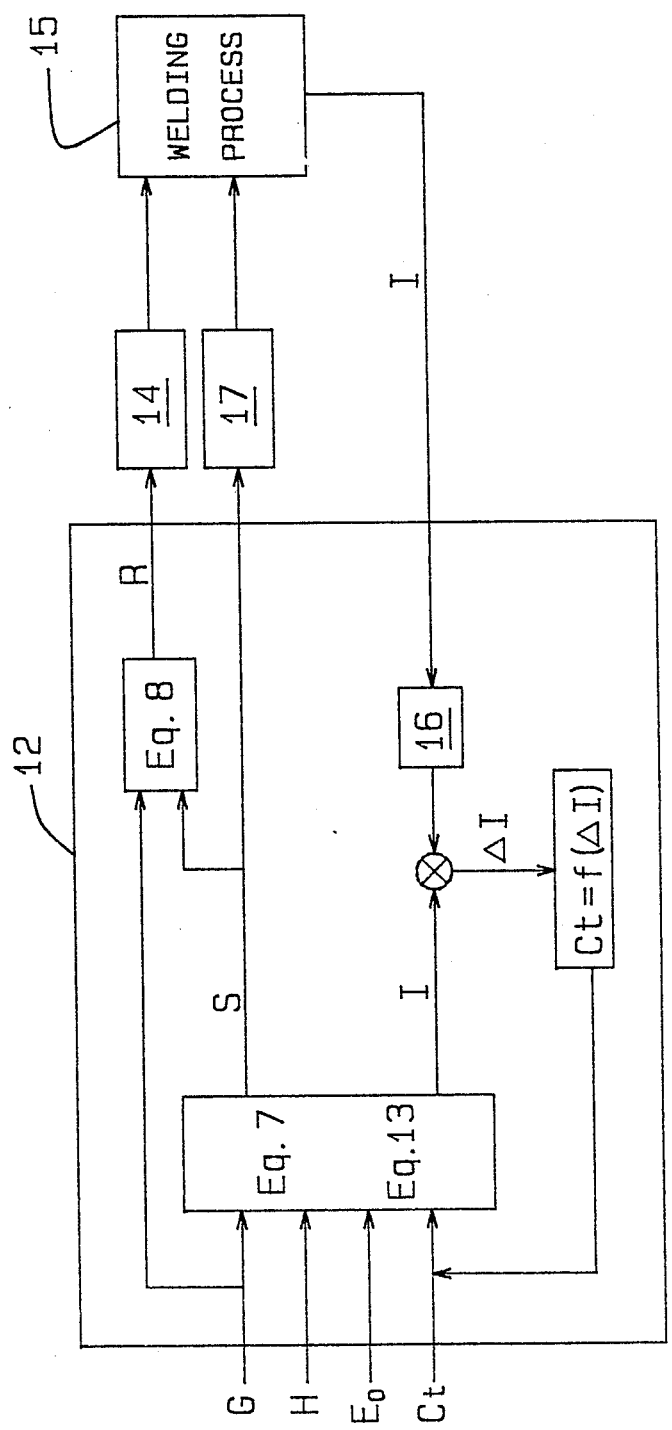
FIG. 1 ia a block diagram of a first embodiment of the present invention which provides for real time control of weld reinforcement area and heat input to the work pieces.

With reference to FIG. 1, the welder 15 is a conventional automated GMA welder with a 300A, 40 VDC power supply. The welder 15 is provided with a motor-driven weld table and motor control means 14 for maintaining constant weld speed. A conventional GMA welding torch is provided with a motor-driven wire feed assembly with an associated motor control means 17 for constant feed rate. Both weld speed and filler wire feed rate may be adjusted by means of signals input to the respective motor control means 14 or 17. The weld table used was capable of traveling in both directions with weld speeds up to 4.2 mm/s. The wire feed was capable of feed rates up to 372 mm/s.

The control method of this invention comprises a continuous feedback closed loop scheme wherein the current I is the parameter that is actually measured. The current is measured by obtaining the voltage drop across a calibrated shunt in the secondary current loop. Since the resulting voltage signal proved to be too noisy for use in directly controlling the process, a digital filter employing a linear difference technique in the time domain is employed. The shunt voltage is measured in sets of thirty values taken at a rate of 3,600 per second. Of each set of thirty, the last twenty values are averaged. At half second intervals, the present averaged value and the previous two values are processed giving the present value double the weight of each of the other two, and averaging to provide a weighted average measure of the current. Alternatively, a hardware filter 16 may be used to filter out higher frequency noise.

Each half second the measured value of the current is compared with a value calculated by computer means 12. Computer means 12 is a desk top computer with advanced input/output programing capability, such as the HP-9000 Model 236. Computer means 12 is programmed to calculate values for S and I in accordance with equations 7 and 13. Computer 12 may alternatively be programmed to employ equation 7 and 9 for these calculations which may provide better control than using equation 13 if better information for estimating $n'$ and $R_a$ becomes available. The desired values of G and H and the actual open circuit potential $E_0$ are input data to the computer 12. Computer 12 uses the comparison between measured and calculated current to compute a new value for Ct, such that equation 13 yields the current as presently measured $\pm 3A$. The program limits the change in Ct at each step to 3 mm to prevent large drastic swings when the desired heat input or desired cross-sectional area G are intentionally changed at the computer input. The computer then makes new calculations of S and I. The new value of S is used to calculate the weld speed R in accordance with equation 8. Signals indicative of the new values of R and S are delivered to motor control means 14 and 17 respectively. The new value of I is compared to the next measured value of I.

Figure 2:
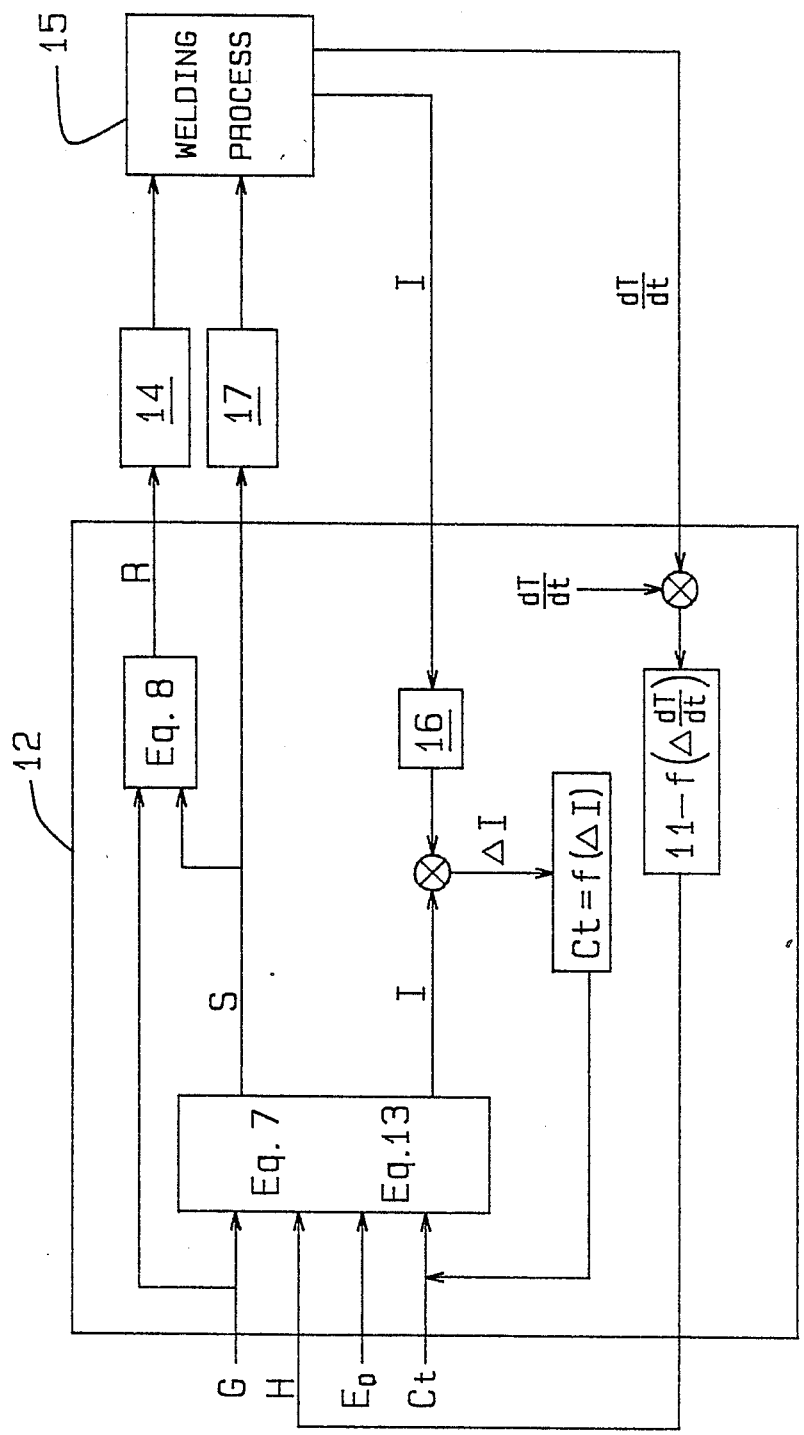
FIG. 2 is a block diagram of a second embodiment of the invention which provides for real time control of the weld reinforcement area and the cooling rate of the weld.

In another embodiment of the invention represented schematically in FIG. 2, the derived model may be employed to directly control weld reinforcement area and the cooling rate of the weld. In this embodiment, current is measured as in the first embodiment, compared to a calculated value, and the difference is used to calculate a correction to the wire feed rate and weld speed R. In addition, the actual cooling rate may be measured by conventional methods, such as infrared optical methods or by means of thermocouples. Signals, indicative of the rate of change of temperature in the weld bead, are compared to a desired value for the cooling rate and the difference is used to generate corrections to the heat input which are then fed back to the input of computer 12. A function relating the heat input or change in heat input as related to the difference between the actual measured rate of change of temperature and a desired rate of change of temperature could be developed by employing the same sort of statistical techniques that were applied to develop the equations for current and arc resistance. Both differences, between measured and calculated current and between measured and desired cooling rate, are used to calculate corrections to the wire feed rate and weld speed.

As each of the embodiments described require the use of an empirically derived equation, one skilled in the art will understand that prior to employing this invention, a series of test runs must be performed in order to calculate the coefficients in equations 12 or 13. These coefficients may be sensitive to certain of the operating parameters, such as, wire size, wire material, the nature of the material of the work piece as well as the size and the geometry of the work piece and the geometry of the weld bead and operating voltage of the power supply. For example, applicants have applied equations 7, 8 and 13 to control the reinforcement area and heat input on a series of welding trials using 0.89 mm diameter, type E-70S-6 wire, with Ar-20$_2$ shielding gas, on 9.5 mm and 12.7 mm thick type A-36 steel plate in a bead-on-plate configuration. For such trials, the open circuit voltage was varied from 30 to 34 volts, the contact tip to base metal distance Ct was varied from 12.7 to 19.5 mm and the weld speed was held constant at 3.81 mm/s. These try-outs yielded the following coefficients for equation 13; $C_o = -149.02$, $C_1 = -3.89$, $C_2 = 10.72$ and $C_3 = 0.38$. The coefficient of determination for these values was 0.96. Using these values in further testing, applicants have found that the control method of the present invention enabled the weld bead reinforcement areas to be maintained to within $\pm 5\%$ of the desired values as the heat input was changed and the heat input to be maintained within $\pm 1\%$ of the desired values when the reinforcement area was changed. Significant changes in the parameters used in determining these coefficients would necessitate a series of tests to establish new values for the coefficients.

Those skilled in the art will recognize that the above described embodiments may be modified and changed in many ways. The foregoing description is considered illustrative only of the principles of the invention and it is not intended to limit the invention to the exact construction or processes shown and described. Accordingly, suitable modifications and equivalents may be resorted to within the scope of the invention as defined by the claims that follow.

TABLE I

Definitions of Welding Terms $A_w$ = cross-sectional area of wire (mm$^2$)
H = heat input per unit length (J/mm)
E = voltage—contact tip to workpiece (V)
I = current (A)
n* = overall heat transfer efficiency
R = welding speed (mm/s)
S = wire feed speed (mm/s)
$E_o$ = open circuit voltage (V)
n = volt/amp slope of power supply (V/A)
$V_w$ = voltage drop across wire length (V)
$V_a$ = voltage drop across length of welding arc (V)
$\delta$ = average wire density (gm/mm$^3$)

$$H_m = h_f + \int_{T_o}^{T_m} C_p dt = \text{heat required to melt wire (J/gm)} =$$

$C_p$ = specific heat of the welding wire (J/gm.K)
$T_o$ = ambient temperature (° C.)
$T_m$ = melting temperature of wire (° C.)
$h_f$ = heat of fusion of wire (J/gm)
n' = fraction of total power transferred from anode spot to solid wire
$C_t$ = contact tip to base metal distance (mm)
$R_a$ = arc resistance (oHms)
dQ/dt = power transferred from the anode spot to the solid wire (J/s)
G = weld reinforcement area (mm$^2$)

The embodiment of the invention in which an exclusive property or privilege is claimed is defined as follows:

1. A method of independently controlling the heat input and weld reinforcement area in a gas metal arc welding process using gas metal arc welding apparatus which includes a power supply having a predetermined relationship (a volt/amp slope n) between the output voltage E (volts) and output current I (amperes) of the power supply, and an electrode filler wire having an average wire density δ (gm/mm$^3$), a cross-sectional area $A_w$ (mm$^2$) and a melting temperature $T_m$ (° C.), means for feeding the filler wire towards a workpiece at a wire feed speed S (mm/s), and means for moving the work piece relative to the filler wire at a welding speed R (mm/s) to create a longitudinal weld in the work piece, comprising the steps of:

selecting a desired heat input H (J/mm) and a desired weld reinforcement area G (mm$^2$);
calculating a filler wire feed rate S, the welding speed R and an expected welding current I for said desired heat input H and weld reinforcement area G by first preselected algorithmic function means;
said first preselected algorithmic function means comprising the equations:

$$S = \frac{GI}{A_w H} n^* (E_o + nI)$$

$$R = \frac{SA_w}{G}$$

$$I = \frac{E_o + \sqrt{E_o^2 + 4[n - (1 - n') R_a] SA_w \delta H_m}}{2[(1 - n') R_a - n]}$$

where
n* = the overall heat transfer efficiency;
$E_o$ = the open circuit voltage (volts) of the power supply,;
n' = the efficiency of the heat transfer from the arc to the filler wire;
$R_a$ = the arc resistance (ohms); and
$H_m$ = the heat required to melt the filler wire (J/gm);
operating the gas metal arc welding apparatus at said calculated wire feed speed S and weld speed R;
measuring the welding current and comparing said welding current with said expected welding current I to generate comparison data;
calculating, by means of second preselected algorithmic function means, a correction to said wire feed speed and weld speed by applying said comparison data; and
applying said correction to the operation of said welding apparatus whereby said desired heat input and said desired weld reinforcement area are achieved in said process.

2. The method of claim 1 wherein said steps of calculating filler wire feed rate, welding speed and expected current, measuring welding current, calculating a correction to the filler wire feed rate and applying said correction are repeated periodically in a closed loop feedback manner for continuous control of weld reinforcement area and heat input.

3. The method of claim 2 wherein said periodical repetition is performed approximately each 0.5 seconds.

4. The method of claim 1 wherein said steps of calculating filler wire feed rate, welding speed and expected current, measuring welding current, calculating a correction to the filler wire feed rate and applying said correction are repeated periodically in a closed loop feedback manner for continuous control of weld reinforcement area and weld bead cooling rate.

5. The method of claim 4 wherein said periodical repetition is performed approximately each 0.5 seconds.

6. A method of independently controlling the heat input and weld reinforcement area in a gas metal arc welding process using gas metal arc welding apparatus which includes a power supply having a predetermined relationship (a volt/amp slope n) between the output voltage E (volts) and output current I (amperes) of the power supply, and an electrode filler wire having an average wire density δ (gm/mm$^3$), a cross-sectional area $A_w$ (mm$^2$) and a melting temperature $T_m$ (°C.), means for feeding the filler wire towards a workpiece at a wire feed speed S (mm/s), and means for moving the workpiece relative to the filler wire at a welding speed R (mm/s) to create a longitudinal weld in the workpiece, comprising the steps of:

selecting a desired heat input H (J/mm) and a desired weld reinforcement area G (mm$^2$);
calculating a filler wire feed rate S, the welding speed R and an expected welding current I for said desired heat input H and weld reinforcement area G by first preselected algorithmic function means;
said first preselected algorithmic function means comprising the equations:

$$S = \frac{GI}{A_w H} n^* (E_o + nI)$$

$$R = \frac{SA_w}{G}$$

$$I = C_0 + C_1 C_t + C_2 E_o + C_3 S$$

where
n* = the overall heat transfer efficiency;
$E_o$ = the open circuit voltage (volts) of the power supply;
$C_t$ is the distance between the bottom of the contact tip and the workpiece; and
$C_0$, $C_1$, $C_2$ and $C_3$ are empirically determined constants;
operating the gas metal arc welding apparatus at said calculated wire feed speed S and weld speed R;
measuring the welding current and comparing said welding current with said expected welding current I to generate comparison data;

calculating, by means of second preselected algorithmic function means, a correction to said wire feed speed and weld speed by applying said comparison data; and applying said correction to the operation of said welding apparatus whereby said desired heat input and said desired weld reinforcement area are achieved in said process.

7. The method of claim 6 wherein said steps of calculating filler wire feed rate, welding speed and expected current, measuring welding current, calculating a correction to the filler wire feed rate and applying said correction are repeated periodically in a closed loop feedback manner for continuous control of weld reinforcement area an heat input.

8. The method of claim 7 wherein said periodical repetition is performed approximately each 0.5 seconds.

9. The method of claim 6 wherein said steps of calculating filler wire feed rate, welding speed and expected current, measuring welding current, calculating a correction to the filler wire feed rate and applying said correction are repeated periodically in a closed loop feedback manner for continuous control of weld reinforcement area and weld bead cooling rate.

10. The method of claim 9 wherein said periodical repetition is performed approximately each 0.5 second.

* * * * *